United States Patent [19]

Tajiri et al.

[11] Patent Number: 5,120,360
[45] Date of Patent: Jun. 9, 1992

[54] MICROCAPSULE-CONTAINING INK COMPOSITION FOR FLEXOGRAPHIC PRINTING

[75] Inventors: Masanao Tajiri; Kazuyoshi Wakata; Kazuyuki Shinmitsu, all of Hyogo; Shunsuke Shioi, Nara, all of Japan

[73] Assignee: Kanzaki Paper Manufacturing Co., Ltd., Tokyo, Japan

[21] Appl. No.: 514,640

[22] Filed: Apr. 25, 1990

[30] Foreign Application Priority Data

Apr. 25, 1989 [JP] Japan .................. 1-106164

[51] Int. Cl.⁵ .............................. C09D 11/00
[52] U.S. Cl. .............................. 106/21; 106/20; 523/161; 428/402.2; 428/411.1; 428/537.5; 428/343
[58] Field of Search ............... 106/21, 20; 523/160, 523/161

[56] References Cited

U.S. PATENT DOCUMENTS

| | | | |
|---|---|---|---|
| 4,191,404 | 3/1980 | Lee et al. | 282/27.5 |
| 4,525,520 | 6/1985 | Shioi et al. | 524/512 |
| 4,601,863 | 7/1986 | Shioi et al. | 264/4.3 |
| 4,640,714 | 2/1987 | Kagota et al. | 106/21 |
| 4,753,968 | 6/1988 | Shioi et al. | 523/208 |
| 4,760,108 | 7/1988 | Asano | 524/451 |
| 4,936,916 | 6/1990 | Shinmitsu et al. | 106/21 |

Primary Examiner—William R. Dixon, Jr.
Assistant Examiner—Margaret V. Einsmann
Attorney, Agent, or Firm—Armstrong & Kubovcik

[57] ABSTRACT

A microcapsule-containing ink composition for flexographic printing containing microcapsules, an adhesive and an ink medium, the composition being characterized in that the adhesive includes a polymer composed of a methacrylate or acrylate singly or as its main component and having an average molecular weight of 3000 to 50,000.

4 Claims, No Drawings

MICROCAPSULE-CONTAINING INK COMPOSITION FOR FLEXOGRAPHIC PRINTING

The present invention relates a microcapsule-containing ink composition for flexographic printing, and more particularly to a microcapsule-containing ink composition which is diminished in lowering in its flowability on flexographic printing plates and usable for printing with good stability.

Pressure sensitive manifold sheets are known which utilize a color forming reaction between various color formers. For example, the reaction occurs between an electron donating chromogenic material such as crystal violet lactone and benzoyl-leucomethylene blue, and an electron accepting acidic reactant material such as activated clay, phenol-formaldehyde condensate and polyvalent metal salt of aromatic carboxylic acid. The reaction is also conducted between a metal salt and a ligand compound, including a combination of a nickel carboxylate and N,N-dibenzyldithiooxamide, or a combination of an iron salt of organic phosphoric acid and lauryl gallate, etc.

For transfer type pressure sensitive manifold sheet, sheets are used in a suitable combination which include a top sheet (CB) comprising a substrate and a layer formed on the surface of the substrate and containing a microcapsule of a color former, the microcapsule being prepared by a coacervation process, interfacial polymerization process, in-situ polymerization process, etc., an under sheet (CF) comprising a substrate and a layer formed on the surface of the substrate and containing a color former which reacts with the above color former to form a color, and a middle sheet (CFB) comprising a substrate provided with the above two layers separately on the opposite surfaces thereof.

Usually, these pressure sensitive manifold sheets are prepared by applying on a substrate by use of a large coater each of aqueous coating compositions which comprise microcapsules containing a color former, and the other color former respectively. As a special process, an ink composition comprising microcapsules which have a color former enclosed therein is spot-printed on a substrate by a printer.

In the spot-printing of a microcapsule-containing ink composition, an expensive microcapsule coating composition can be printed only in necessary portions of the substrate. Thus, this process has excellent advantages that it is economical and a manifold sheet can easily be obtained which has different colors in portions, compared with a coating method in which an aqueous coating composition is applied to a whole surface of a substrate with use of a large coater. Nevertheless, this printing method still remains to be improved despite its great advantage over the method using a coating machine. More specifically, the printing method has the drawback that when the microcapsule-containing ink composition is applied by flexographic printing to obtain pressure sensitive mainfold paper, the ink composition is prone to a marked reduction in its flowability on the printing plate due to drying, therefore accumulates on the plate and is not usable with good stability for continuous printing. Further, the printing method has the drawback to cause rupture of the microcapsule during printing due to an accumulation of the ink composition.

An object of the present invention is to overcome the above drawback involved in the use of the conventional microcapsule-containing ink composition for flexographic printing and to provide a flexographic microcapsule-containing ink composition which ensures a stable printing operation.

The above and other objects of the invention will become apparent from the following description.

The present invention provides a microcapsule-containing ink composition for flexographic printing containing microcapsules, an adhesive and an ink medium, the composition being characterized in that the adhesive comprises a polymer composed of a (meth)acrylate singly or as its main component and having an average molecular weight of 3000 to 50,000.

To fulfill the above object, we have conducted intensive research on the relationship between the adhesive serving as a component of ink compositions and the flowability of the composition and found that the reduction in the flowability of the ink composition on the printing plate due to drying during printing operation can be remarkably diminished by using as the adhesive for microcapsules a (meth)acrylate polymer having an average molecular weight of 3000 to 50,000. Incidentally, if the (meth)acrylate polymer used is less than 3000 in average molecular weight, the microcapsules will not be adhered to the substrate effectively, whereas the presence of those exceeding 50,000 in average molecular weight tends to give lower flowability to the ink composition due to increased viscosity. This indicates that (meth)acrylate polymers ranging from 3000 to 50,000 in average molecular weight are most preferable to use in ensuring both adhesion and flowability in balance.

The (meth)acrylate polymer for use in the present invention is a polymer composed of 50 to 100 wt % of a (meth)acrylate as a component monomer. Examples of (meth)acrylate monomers are methyl, ethyl, propyl, butyl or ethylhexyl ester of acrylic acid or methacrylic acid. The monomers used for copolymerizing with the (meth)acrylate monomer include an aromatic vinyl monomer such as styrene, α-methylstyrene, vinyltoluene and monochlorostyrene; unsaturated acid monomer such as acrylic acid, methacrylic acid, crotonic acid, cinnamic acid, itaconic acid, fumaric acid, maleic acid, monoethyl itaconate, monobutyl maleate and acrylamide propanesulfonic acid; unsaturated nitrile monomer such as acrylonitrile, methacrylonitrile and α-chloroacrylonitrile; and unsaturated carboxylic acid amide monomer such as acrylamide, methacrylamide, N-methylolacrylamide and diacetoacrylamide. In case the monomer which is copolymerized with the (meth)acrylate monomer is an acid, the resulting polymer is also usable as a sodium salt, potassium salt or the like after neutralization. In the present invention, also usable is an adhesive other than the above (meth)acrylate polymer. Examples thereof are polyvinyl acetate, vinyl chloride-vinyl acetate copolymer, ethylene-maleic anhydride copolymer, styrene-maleic anhydride copolymer, methyl vinyl ether-maleic anhydride copolymer, isobutylene-maleic anhydride copolymer, modified polyvinyl alcohol, polyvinyl butyral, polyvinyl pyrrolidone, ethyl cellulose, nitrocellulose, hydroxypropyl cellulose, cellulose acetate propionate and cellulose acetate butyrate.

The microcapsule-containing ink compositions for flexographic printing of the present invention are useful typically for preparing pressure sensitive manifold paper and are used also as perfume-encapsulated ink compositions, liquid crystal-encapsulated ink compositions, temperature-sensitive material encapsulated ink compositions and the like for flexographic printing. As a typical example, the composition for use in pressure sensitive manifold paper will be described.

Examples of color formers for use in the microcapsule-containing ink composition of the present invention for pressure-sensitive manifold paper are the combination of an electron donating chromogenic material and an electron accepting acidic reactant material, the combination of a metal salt and a ligand compound, etc.

Examples of useful electron donating chromogenic materials are those known in the field of a pressure sensitive manifold sheet and are the following compounds.

Triarylmethane-based dyes, e.g., 3,3-bis(p-dimethylaminophenyl)-6-dimethylaminophthalide, 3-(p-dimethylaminophenyl)-3-(1,2-dimethylinodole-3-yl)phthalide, 3,3-bis(1,2-dimethylindole-3-yl)-5-dimethylaminophthalide and 3,3-bis(9-ethylcarbazole-3-yl)-6-dimethylaminophthalide;

Diphenylmethane-based dyes, e.g., 4,4'-bis-dimethylaminobenzhydryl benzyl ether, N-halophenyl-leucoauramine and N-2,4,5-trichlorophenyl-leucoauramine;

Thiazine-based dyes, e.g., benzoyl-leucomethyleneblue and p-nitrobenzoyl-leucomethyleneblue;

Spiro-based dyes, e.g., 3-methyl-spirodinaphthopyran, 3-phenyl-spiro-dinaphthopyran and 3-propyl-spiro-dibenzopyran;

Lactam-based dyes, e.g., rhodamine-B-anilinolactam, rhodamine-(o-chloranilino)lactam and rhodamine-(o-chloroanilino)lactam;

Fluoran-based dyes, e.g., 3-dimethylamino-7-methoxyfluoran, 3-diethylamino-6-methyl-7-chlorofluoran, 3-(N-ethyl-p-toluidino)-7-methylfluoran, 3-diethylamino-7-N-methylaminofluoran, 3-diethylamino-7-dibenzylaminofluoran, 3-(N-ethyl-p-toluidino)-6-methyl-7-phenylaminofluoran, 3-diethylamino-6-methyl-7-phenylaminofluoran, 3-(N-cyclohexyl-N-methylamino)-6-methyl-7-phenylaminofluoran, 3-piperidino-6-methyl-7-phenylaminofluoran, 3-diethylamino-6-methyl-7-xylidinofluoran;

Dyes forming color which is readable with infrared ray, e.g., 3,3-bis[2-(p-dimethylaminophenyl)-2-(p-methoxyphenyl)ethylene-2-yl]-4,5,6,7-tetrachlorophthalide; and a mixture of these dyes.

The electron accepting acidic reactant materials are those known in the field of a pressure sensitive manifold sheet and include acid clay, activated clay, attapulgite, zeolite, bentonite and like clay minerals; phenolic resins; multi-valent metal salts of aromatic carboxylic acids disclosed in Japanese Examined Patent Publication No. 25174/1976; zinc salts of 2,2'-bisphenolsulfone compounds disclosed in Japanese Unexamined Patent Publication No. 106313/1979; and a mixture of these compounds.

Examples of useful combinations of the metal salt and ligand compound are those which are known in a pressure sensitive manifold sheet and are the following combinations.

Nickel stearate and N,N'-dibenzyl-dithiooxamide; nickel laurate and α-benzylglyoxime; ammonium tricaprylmethyl vanadate and 8-hydroxyquinolinesulfonic acid dodecylamine; ammonium benzyllauryldimethyl molybdate and lauryl protocatechuate; titanium stearate and lauryl gallate; iron naphthenate and benzyl gallate; polyferrophenylmethylsiloxane and methylenebis(8-oxyquinoline); copper palmitate and N,N'-bis-2-octanoyloxyethyldiethyldithiooxamide; cobalt laurate and di-o-tolylguanidine; hinokitiol and polyvanadophenylmethylsiloxane; lauryl gallate and iron salt of organic phosphoric acid which is disclosed in U.S. Pat. No. 4,533,930; and a mixture thereof.

In the microencapsulation of the above color former, the color former is usually encapsulated as dissolved in an oil.

Examples of oils are cotton seed oil and like vegetable oils; kerosene, paraffin, naphthene oil, chlorinated paraffin and like mineral oils; alkylated biphenyl, alkylated terphenyl, alkylated naphthalene, diarylethane, triarylmethane, diphenylalkane and like aromatic hydrocarbons; oleyl alcohol, tridecyl alcohol, benzyl alcohol, 1-phenylethyl alcohol, glycerin and like alcohols; oleic acid and like organic acids; dimethyl phthalate, diethyl phthalate, di-n-butylphthalate, dioctyl phthalate, diethyl adipate, dipropyl adipate, di-n-butyl adipate, dioctyl adipate and like esters; tricresyl phosphate, tributyl phosphate, tributyl phosphite, tributyl phosphooxamide and like organic phosphorus compounds; phenylcellosolve, benzyl carbitol, polypropylene glycol, propylene glycol monophenyl ether and like ethers; N,N-dimethyllauramide, N,N-dimethylstearamide, N,N'-dihexyloctylamide and like acid amides; diisobutyl ketone, methyl hexyl ketone and like ketones; ethylene carbonate, propylene carbonate and like alkylene carbonates; and a mixture of these compounds.

While microcapsules can be prepared by known processes such as the coacervation process, interfacial polymerization process and in-situ polymerization process, it is desirable to use a synthetic resin as the capsule film forming material. It is especially desirable to use melamine-formaldehyde resin capsules as disclosed in Japanese Examined Patent Publication No. 35258/1984. Pressure sensitive manifold sheets can then be obtained with excellent properties.

The microcapsules may have enclosed therein an antioxidant, ultraviolet absorber, etc. when required.

The microcapsule dispersion thus obtained and containing a color former is made into powdery capsules from the dispersion or after concentrated by filtration or the like, by removing most of the medium by air drying, surface drying, flow drying, air-stream drying, spray drying, vacuum drying, freeze drying, infrared drying, high-frequency drying, ultrasonic drying, pulverization drying or like method. The powdery capsule is then dispersed in a medium for a flexographic printing ink to form a microcapsule ink composition.

Examples of the medium for the flexographic ink composition are those known in the flexographic printing and are, for example, benzene, toluene, xylene, cyclohexane, hexane, ligroin, methyl isobutyl ketone, methyl acetate, ethyl acetate, butyl acetate, methyl cellosolve, ethyl cellosolve, methanol, ethanol, n-propyl alcohol, isopropyl alcohol, n-butanol. In case of using ethanol as a main component of the ink medium, an excellent improvement can be achieved by the addition of (meth)acrylate polymer.

Besides microcapsules and the adhesive, other additives can be added to the ink composition which include white pigments, desensitizers, capsule protecting agents, ultraviolet absorbers, antioxidants, fluorescent dyes and plasticizers.

The present microcapsule-containing ink composition usually comprises 2 to 100 parts by weight of microcapsules and 1 to 150 parts by weight of adhesive, preferably 5 to 50 parts by weight of microcapsules and 5 to 50 parts by weight of adhesive, per 100 parts by weight of an ink medium. Further according to the invention, 10 to 100 wt% of the whole adhesive is a homopolymer or copolymer of the (meth)acrylate.

The microcapsule-containing ink composition thus prepared is applied by flexographic printing to a suitable substrate, for example, paper, synthetic paper or synthetic resin film, or to the rear side of an accepting sheet (under sheet) comprising such a substrate and a color accepting layer formed thereon. The cell types of anilox rolls for use in printing generally include the pyramid type, quadra type, trihelicoid type and hexagonal type. The quadra type, hexagonal type and pyramid type are desirable to use for the composition of the invention.

The amount of the ink composition to be applied is adjusted suitably in accordance with the type of ink composition and is not limited specifically. It is generally suitable to use the composition in an amount is generally suitable to use the composition in an amount of about 0.3 to about 10 g/m$^2$, preferably about 1 to about 5 g/m$^2$.

The accepting layer can be formed by a known method, for example, by applying to a substrate a coating composition consisting essentially of a white pigment, binder and another color former which is reactive with the encapsulated color former to form a color.

This invention will be described below in more detail to show the effect more clearly with reference to Examples and Comparative Examples by no means limited to, in which parts and percentages are all by weight, unless otherwise specified.

EXAMPLE 1

Preparation of Ink Composition Containing Microcapsules Enclosing Electron Donating Chromogenic Material In 100 parts of alkyldiphenylethane (Hisol S A S-296, Nippon Petrochemicals Co., Ltd.) was dissolved with heating 8 parts of crystal violet lactone to obtain an inner-phase oil. To 200 parts of 3.0% aqueous solution of ethylene-maleic anhydride copolymer (EMA-31, Monsanto Co., Ltd.) was added dropwise 20% aqueous solution of sodium hydroxide to adjust pH to 6.0. The above inner-phase oil was emulsified in the solution and the emulsion was heated to 55° C.

Separately, to 45 parts of 37% aqueous solution of formaldehyde was added 15 parts of melamine and the mixture was reacted at 60° C. for 15 minutes to prepare a prepolymer aqueous solution.

The prepolymer solution was added dropwise to the above emulsion and thereto added dropwise 0.1N HCl with stirring to adjust pH to 5.3, and the mixture was heated to 80° C., and maintained at the same temperature for one hour. Thereto was added 0.2N HCl to adjust pH to 3.5, and the mixture was maintained at 80° C. for 3 hours, then allowed to cool to obtain a capsule dispersion containing particles 3.0 μ in average size.

The capsule dispersion was filtered and dried to obtain powdery capsules. In 580 parts of ethanol was dispersed 100 parts of the capsule. To the dispersion were added 50 parts of sodium salt of ethyl acrylate-acrylic acid copolymer having an average molecular weight of 26,000 (monomer weight ratio=85/15) and 20 parts of ethyl cellulose No. 14 (Hercules Inc.) to prepare a flexographic capsule ink composition.

Preparation of Middle Sheet

The capsule-containing ink composition was applied to the uncoated surface of the under sheet described below at a speed of 80 m/min flexographically by a business form printer having a pyramid-type anilox roll, 75 in the number of lines, to obtain a sheet spot-printed with 10×10 cm squares and bearing the composition in an amount of 3.0 g/m$^2$. Although the printing operation was conducted continuously over a sheet length of 4000 m, no accumulation of the ink composition was observed on the plate during printing. Thus, the ink composition was usable with high stability for continuous printing. Two middle sheets thus obtained were superposed with the capsule layer in contact with the color accepting layer and then treated by heating at 100° C. for 5 hours, but the sheets developed no smudge on the color accepting layer. This indicates that the microcapsules remained almost free of rupture during printing. Two middle sheets thus obtained were superposed with the capsule layer in contact with the color accepting layer and then rubbed each other five times giving a load of 300 g/cm$^2$, but the sheets developed no smudge on the color accepting layer.

Preparation of Under Sheet

A 65-parts quantity of precipitated calcium carbonate, 20 parts of zinc oxide, 15 parts of molten mixture (80/20) of zinc 3,5-di(α-methylbenzyl)salicylate and α-methylstyrene/styrene copolymer, 5 parts (as solids) of aqueous solution of polyvinyl alcohol and 300 parts of water were pulverized by a ball mill for 24 hours to obtain a dispersion. To the dispersion was added 20 parts (as solids) of carboxy-modified styrene/butadiene copolymer latex to prepare a coating composition for color accepting layer. The coating composition was applied by an air-knife coater to a paper substrate weighing 40 g/m$^2$ in an amount of 5 g/m$^2$ by dry weight to obtain an under sheet.

EXAMPLES 2 TO 8

Seven kinds of middle sheets were obtained using a capsule-containing ink composition which was prepared in exactly the same manner as in Example 1 except that 50 parts of sodium salt of ethyl acrylate-acrylic acid copolymer with an average molecular weight of 26,000 was replaced by 50 parts of poly(n-butyl acrylate) with an average molecular weight of 5000 (Example 2), 50 parts of poly(ethyl acrylate) with an average molecular weight of 15,000 (Example 3), 50 parts of poly(ethyl methacrylate) with an average molecular weight of 45,000 (Example 4), 50 parts of n-butyl acrylate-acrylic acid amide (monomer weight ratio=90/10) copolymer with an average molecular weight of 3000 (Example 5), 50 parts of sodium salt of methyl acrylate-2-ethylhexyl acrylate-acrylic acid (monomer weight ratio=84/10/6) copolymer with an average molecular weight of 35,000 (Example 6), 50 parts of ethyl acrylate-n-butyl acrylate-acrylic acid (monomer weight ratio=80/10/10) copolymer with an average molecular weight of 21,000 (Example 7), or 50 parts of sodium salt of methyl acrylate-styrene-acrylic acid (monomer weight ratio=85/5/10) copolymer with an average molecular weight of 10,000 (Example 8). No accumulation of the ink composition was observed on the plate during printing. This reveals that the composition was usable with high stability for continuous printing. When two middle sheets obtained were placed over each other and then treated by heating at 100° C. for 5 hours, neither of the sheets developed smudges on the color accepting layer. This indicates that the microcapsules remained almost free of rupture during printing. Two middle sheets thus obtained were superposed and then rubbed each other five times giving a load of 300 g/cm$^2$, but the sheets developed no smudge on the color accepting layer.

EXAMPLE 9

A middle sheet was obtained by printing a flexographic capsule-containing ink composition prepared in the same manner as in Example 1 except that 580 parts of ethyl acetate was used as an ink medium in place of 580 parts of ethanol. Accumulation of the ink composition was hardly observed on the plate during printing. Thus, the composition was usable with relatively high stability for continuous printing. Two middle sheets thus obtained were superposed and then treated by heating at 100° C. for 5 hours, but the sheets developed smudge slightly on the color accepting layer, which indicates no problem practically.

EXAMPLE 10

A middle sheet was obtained by printing a flexographic capsule-containing ink composition prepared in the same manner as in Example 1 except that ethyl cellulose No. 14 was not used. No accumulation of the ink composition was observed on the plate during printing. This reveals that the composition was usable with high stability for continuous printing. When two middle sheets obtained were placed over each other and then treated by heating at 100° C. for 5 hours, neither of the sheets developed smudges on the color accepting layer. This indicates that the microcapsules remained almost free of rupture during printing. Two middle sheets thus obtained were superposed and then rubbed each other five times giving a load of 300 g/cm$^2$, but the sheets developed smudge slightly on the color accepting layer, which indicates no problem practically.

COMPARATIVE EXAMPLE 1

A middle sheet was obtained using a capsule-containing ink composition which was prepared in exactly the same manner as in Example 1 with the exception of not using 50 parts of sodium salt of ethyl acrylate-acrylic acid copolymer with an average molecular weight of 26,000. However, the ink composition accumulated in an increasing amount on the plate with time during printing and was not usable with good stability for continuous printing. When heat-treated in the same manner as in Example 1, samples obtained in the early stage of printing developed considerable smudges on the color accepting layer, hence rupture of microcapsules.

COMPARATIVE EXAMPLE 2

A middle sheet was obtained using a flexographic capsule-containing ink composition which was prepared in the same manner as in Example 1 except that 50 parts of poly(ethyl methacrylate) having an average molecular weight of 55,000 was used in place of 50 parts of sodium salt of ethyl acrylate-acrylic acid copolymer having an average molecular weight of 26,000. However, the ink composition accumulated considerably on the plate during printing and was much inferior to Example 1 in operation. When two middle sheets obtained were superposed and then treated by heating at 100° C. for 5 hours, the sheets developed marked smudge on the color accepting layer, which indicates unsuitable practically.

COMPARATIVE EXAMPLE 3

A middle sheet was obtained using a flexographic capsule-containing ink composition which was prepared in the same manner as in Example 1 except that 50 parts of poly(ethyl methacrylate) having an average molecular weight of 2000 was used in place of 50 parts of sodium salt of ethyl acrylate-acrylic acid copolymer having an average molecular weight of 26,000.

No accumulation of the ink composition was observed on the plate during printing. Two middle sheets thus obtained were superposed and then treated by heating at 100° C. for 5 hours, but the sheets developed no smudge on the color accepting layer. This indicates that the microcapsules remained almost free of rupture during printing. Two middle sheets thus obtained were superposed with the capsule layer in contact with the color accepting layer and then rubbed each other five times giving a load of 300 g/cm$^2$, but the sheets developed marked smudge on the color accepting layer, which indicates that the adhesive used was insufficient.

EXAMPLE 11

Preparation of Ink Composition Containing Microcapsules Enclosing Ligand Compound In a mixture of 40 parts of diethyl adipate and 40 parts of di-n-butyl adipate was dissolved with heating 20 parts of lauryl gallate to obtain an inner-phase oil.

A flexographic capsule-containing ink composition was prepared in the same manner as in Example 1 with the exception of using the above inner-phase oil.

Preparation of Middle Sheet

The capsule-containing ink composition was applied to the uncoated surface of the under sheet described below at a speed of 80 m/min flexographically by a business form printer having a pyramid-type anilox roll, 50 in the number of lines, to obtain a sheet spot-printed with 10×10 cm squares and bearing the composition in an amount of 4.0 g/m$^2$. Although the printing operation was conducted continuously over a sheet length of 4000 m, no accumulation of the ink composition was observed on the plate during printing. Thus, the composition was usable with high stability for continuous printing. Two middle sheets thus obtained were superposed and then treated by heating at 100° C. for 5 hours, but the sheets developed no smudge on the color accepting layer. This indicates that the microcapsules remained almost free of rupture during printing.

Preparation of Under Sheet

To 1200 parts of 5% aqueous solution of sodium hydroxide were added 188 parts of diphenyl phosphate and 134 parts of tert-butylbenzoic acid. Thereto was added an aqueous solution of 135 parts of ferric chloride in 1000 parts of water with stirring to form precipitates which were complex iron salt of diphenyl phosphate and tert-butylbenzoic acid. The precipitate was filtered, washed and dried to obtain pale-colored fine powders.

To 150 parts of water were added one part of sodium polyphosphoric acid, 15 parts of the above complex iron salt powder, 35 parts of titanium oxide, 50 parts of precipitated calcium carbonate and 20 parts (as solid) of carboxy-modified styrene-butadiene copolymer latex to prepare a coating composition.

The coating composition was applied by an air knife coater to a paper substrate weighting 40 g/m² in an amount of 6 g/m² by dry weight to prepare an under sheet.

COMPARATIVE EXAMPLE 4

A middle sheet was obtained using a capsule-containing ink composition which was prepared in exactly the same manner as in Example 11 with the exception of not using 50 parts of sodium salt of ethyl acrylate-acrylic acid copolymer with an average molecular weight of 26,000. However, the ink composition accumulated in an increasing amount on the plate with time during printing and was not usable with good stability for continuous printing. When heat-treated in the same manner as in Example 1, samples obtained in the early stage of printing developed considerable smudges on the color accepting layer, hence rupture of microcapsules.

The flexographic microcapsule-containing ink composition of the present invention has the great advantage of being diminished in reduction in its flowability on the printing plate, therefore less prone to accumulation on the plate and usable with high stability for continuous printing.

We claim:

1. A microcapsule-containing ink composition for flexographic printing containing microcapsules, an adhesive and an ink medium, the composition being characterized in that the adhesive comprises a polymer composed of 50-100% of a methacrylate or an acrylate monomer singly or as its main component and having an average molecular weight of 3000 to 50,000, said ink medium is at least one compound selected from the group consisting of benzene, toluene, xylene, cyclohexane, hexane, ligroin, methyl isobutyl ketone, methyl acetate, ethyl acetate, butyl acetate, methyl Cellosolve, ethyl Cellosolve, methanol, ethanol, n-propyl alcohol, isopropyl alcohol and n-butanol, wherein said adhesive is present in an amount effective to ensure that said microcapsules will adhere to a substrate selected from the group consisting of paper, synthetic paper and synthetic resin film; said microcapsules are present in an amount effective to permit a detectable image to be formed on an ink composition accepting substrate; and said ink medium being present in an amount effective to disperse said microcapsules.

2. A microcapsule-containing ink composition as defined in claim 1 wherein the composition comprises 2 to 100 parts by weight of microcapsules and 1 to 150 parts by weight of the adhesive, per 100 parts by weight of the ink medium.

3. A microcapsule-containing ink composition as defined in claim 1 wherein 10 to 100 wt % of the whole adhesive is a homopolymer or copolymer of the methacrylate or acrylate.

4. A microcapsule-containing ink composition as defined in claim 1 wherein the ink medium comprises ethanol as a main component.

* * * * *